US010788017B2

(12) United States Patent
Vind et al.

(10) Patent No.: US 10,788,017 B2
(45) Date of Patent: Sep. 29, 2020

(54) METHOD AND APPARATUS FOR WEIGHING AN ELONGATE OBJECT

(71) Applicant: Vestas Wind Systems A/S, Aarhus N (DK)

(72) Inventors: Flemming Vind, Lem St (DK); Vijayasankar Irissappane, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 191 days.

(21) Appl. No.: 16/081,792

(22) PCT Filed: Mar. 1, 2017

(86) PCT No.: PCT/DK2017/050057
§ 371 (c)(1),
(2) Date: Aug. 31, 2018

(87) PCT Pub. No.: WO2017/148486
PCT Pub. Date: Sep. 8, 2017

(65) Prior Publication Data
US 2019/0010928 A1   Jan. 10, 2019

(30) Foreign Application Priority Data

Mar. 1, 2016 (GB) .................................. 1603545.3

(51) Int. Cl.
*F03D 13/35* (2016.01)
*G01G 19/18* (2006.01)
(Continued)

(52) U.S. Cl.
CPC .............. *F03D 13/35* (2016.05); *B66C 1/108* (2013.01); *F03D 13/10* (2016.05); *F03D 17/00* (2016.05);
(Continued)

(58) Field of Classification Search
CPC .......... F03D 13/35; F03D 13/10; F03D 17/00; B66C 1/108; G01G 23/002; G01G 19/18;
(Continued)

(56) References Cited

U.S. PATENT DOCUMENTS 5,760,415 A    6/1998  Hauck et al.
5,824,897 A *  10/1998 Beachum ................ G01M 1/12
                                                        73/456
(Continued)

FOREIGN PATENT DOCUMENTS

CN    101344422 A    1/2009
CN    202033092 U    11/2011
(Continued)

OTHER PUBLICATIONS

English Translation of KR-20160062653-A, Ju et al., (Year: 2016).*
(Continued)

*Primary Examiner* — Ryan D Walsh
(74) *Attorney, Agent, or Firm* — Wood Herron & Evans LLP

(57) ABSTRACT

Method and apparatus for weighing an elongate object extending between a root end and a tip end thereof, said method including: providing a respective tip load measurement gauge and root load measurement gauge; and providing a suspending arrangement configured for suspending said elongate object from said tip load measurement gauge and from said root load measurement gauge; and suspending said object in a horizontal orientation; and recording a tip load and a root load from respective said load measurement gauges, said method being additionally characterised by: providing a weighing area; and fixing an inclinometer to said suspended blade and load gauge arrangement; and suspending said elongate object from said tip load gauge and from said root load gauge; and adjusting the horizontality of said elongate object in response to signals from said inclinometer prior to said step of recording said tip load and said root load. Alternatively, an inclinometer may be replaced by placing a first distance sensor at a first location on a ground surface; and placing a second distance sensor at a second location on said ground surface; and suspending said elon- (Continued)

gate object from said tip load gauge and from said root load gauge such that a said root end thereof is suspended proximate said first distance sensor and a said tip end thereof is suspended proximate said second distance sensor; and measuring a first distance between said first distance sensor and a said root portion of said elongate object and; and measuring a second distance between said second distance sensor and a said tip portion of said elongate object; and then adjusting the horizontality of said elongate object in response to said first and second distance readings prior to said step of recording said tip load and said root load.

18 Claims, 7 Drawing Sheets

(51) Int. Cl.
| | |
|---|---|
| *F03D 17/00* | (2016.01) |
| *G01G 23/00* | (2006.01) |
| *F03D 13/10* | (2016.01) |
| *B66C 1/10* | (2006.01) |
| *G01M 1/12* | (2006.01) |

(52) U.S. Cl.
CPC ............ *G01G 19/18* (2013.01); *G01G 23/002* (2013.01); *G01M 1/122* (2013.01); *F05B 2220/30* (2013.01); *F05B 2230/10* (2013.01); *F05B 2240/30* (2013.01); *F05B 2260/80* (2013.01); *F05B 2260/83* (2013.01); *Y02E 10/72* (2013.01)

(58) Field of Classification Search
CPC .... G01M 1/122; Y02E 10/72; F05B 2220/30; F05B 2230/10; F05B 2240/30; F05B 2260/80; F05B 2260/83
See application file for complete search history.

(56) References Cited

U.S. PATENT DOCUMENTS

| | | | |
|---|---|---|---|
| 2002/0024598 A1 | 2/2002 | Kunimitsu et al. | |
| 2010/0018055 A1* | 1/2010 | Lynderup | B66C 23/36 29/889 |
| 2010/0242598 A1* | 9/2010 | Pedersen | G01M 1/12 73/456 |
| 2011/0185571 A1* | 8/2011 | Maj | B66C 1/108 29/889 |
| 2015/0344272 A1 | 12/2015 | Lin | |
| 2015/0345465 A1 | 12/2015 | Westergaard | |
| 2018/0180029 A1* | 6/2018 | Caponetti | G01L 1/22 |
| 2020/0116131 A1* | 4/2020 | Pedersen | G01L 5/00 |

FOREIGN PATENT DOCUMENTS

| | | | | |
|---|---|---|---|---|
| CN | 102331326 A | | 1/2012 | |
| JP | 2012037469 A | | 2/2012 | |
| JP | 2012241679 A | | 12/2012 | |
| KR | 20160062653 A | * | 6/2016 | |
| WO | 2012062352 A1 | | 5/2012 | |
| WO | WO-2015046651 A1 | * | 4/2015 | ............ G01M 1/122 |

OTHER PUBLICATIONS

English Abstract of KR-20160062653-A, Ju et al, (Year: 2016).*
China National Intellectual Property Administration, First Notification of Office Action in CN Application No. 201780024115.6, dated Sep. 4, 2019.
Intellectual Property Office, Seach and Examination Report in GB1603545.3, dated Sep. 1, 2016.
European Patent Office; Search Report and Written Opinion in related International Patent Application No. PCT/DK2017/050057 dated Jun. 12, 2017; 15 pages.
European Patent Office; International Preliminary Report on Patentability in related International Patent Application No. PCT/DK2017/050057 dated Mar. 15, 2018; 6 pages.

* cited by examiner

METHOD AND APPARATUS FOR WEIGHING AN ELONGATE OBJECT

The present invention relates to improvements in weighing elongate objects. In particular, the present invention relates to weighing large, elongate objects, preferably by suspending the objects. Still more particularly, the present invention relates to weighing wind turbine components such as wind turbine blades.

It may be desirable to determine a product's assembled weight, for example before releasing the product, or as part of a finishing or quality checking process. Weighing an object may be carried out in order to ascertain its centre of gravity location. The determination of the weight of a large object can be a relatively unwieldy task, due to the need to manipulate, handle and position a large object, while at the same time ensuring that the weight determination can be accurately carried out. Time can be lost. Specialised equipment can be needed. In some cases, specialised equipment may be needed for each product type or model.

For example, it has been known to weigh large elongate objects such as wind turbine blades by placing them in a fixed rig including a root weighing and a tip weighing device. These devices are typically configured such that they are each at a fixed location, e.g. on a shop floor, and a spaced predefined distance apart, and configured such that they define predetermine respective heights. This may ensure that a particular blade type will adopt a reference orientation during weighing, defined by the geometry, dimensions and spacing of the respective, fixed, root and tip weighing jigs. This arrangement may also ensure that the weighing jigs are always spaced apart the correct distance for the specific design of blade to be weighed. This arrangement may allow the reliable determination of blade attributes such as its centre of gravity location or other dynamically relevant parameters. However, in an installation in which multiple blade types are to be produced, this type of weighing arrangement needs to be replicated for each blade type, in different parts of the installation, and can therefore demand significant amounts of space.

In patent application document JP2012-241679, it has been suggested to weigh a wind turbine blade by suspending it from load sensors, one positioned at a root portion and another at a tip portion. A subsequent addition of ballast may be carried out if required, in order to adjust the blade's centre of gravity.

As wind turbine blades become ever larger, the space, equipment; special knowledge and time needed for weighing operations tends also to increase. The present invention sets out to provide improvements to blade weighing techniques and systems.

SUMMARY OF THE INVENTION

In aspects, the invention resides in an improved method and means for examining an elongate object. More particularly, in aspects, the invention resides in an improved method and means for bringing an elongate object to be weighed into a predetermined angular orientation prior to weighing. In aspects, the invention resides in a more flexible method and means for examining an elongate object. To these and other ends, the present invention provides a method as defined in appended claim 1. Further optional features thereof are defined in appended claims 2-10 and are in particular described in the present specification and drawings.

Accordingly, the present invention provides a method for weighing an elongate object, such as wind turbine blade, which elongate object extends between a root end and a tip end thereof. The method includes providing a respective tip load measurement gauge and root load measurement gauge, and providing a suspending arrangement for suspending the elongate object from the respective tip and root load measurement gauges, and freely suspending the elongate object in a substantially horizontal orientation, before recording a tip load reading and a root load reading from the respective load measurement gauges. The method in particular additionally includes;

providing a weighing area including a ground surface;
placing a first distance sensor at a first location on the ground surface;
placing a second distance sensor at a second location on the ground surface, the second location being spaced apart from the first location; and
suspending the elongate object from the tip load gauge and from the root load gauge such that a root end thereof is suspended proximate, preferably above, the first distance sensor and a tip end thereof is suspended proximate, preferably above; the second distance sensor; and
measuring a first vertical distance between the first distance sensor and a root portion of the elongate object; and measuring a second vertical distance between the second distance sensor and a tip portion of the elongate object; and
adjusting the horizontality of the elongate object in response to the first and second distance readings prior to the step of recording the tip load and the root load.

Preferably, the step of measuring a first distance between the first distance sensor and a root portion of the elongate object includes measuring the distance between the first distance sensor and a predefined reference location at a root portion of the elongate object. Preferably, measuring a second distance between the second distance sensor and a tip portion of the elongate object includes measuring the distance between the second distance sensor and a predefined reference location at a tip portion of the elongate object. Preferably, said first and said second distance sensors may be contactless distance sensors. The term horizontality in this context denotes a degree of horizontality, that is to say an orientation in space with respect to the horizontal. It is not intended to denote a precise horizontal arrangement of the elongate object although this is not excluded. In aspects, the elongate object may preferably be suspended such that it is supported at a tip load point and a root load point. The relative positions of the respective tip and root load points are preferably known. In particular, a horizontal distance between a root load point and a tip load point may preferably be known. Preferably, the location on the elongate object of the respective tip load point and the root load point may be known. In particular, the location on the elongate object of the respective tip load point and the root load point may be known in relation to the geometry of the elongate object.

The term "elongate object", in the present context may be understood to designate an object having a longitudinal extent considerably in excess of a transverse extent thereof. By way of example, the term "elongate object" may denote an object having a length:width ratio above 4:1, more preferably above 5:1, still preferably above 6:1. By way of example, the term "elongate object" may denote a large elongate object, preferably an object having a length greater than 10 m, still preferably above 12 m, still further preferably above 15 m or above 20 m or above 30 m. In embodiments an elongate object may be a wind turbine component such as a blade or an elongate section thereof, or a structural spar or an elongate section thereof, or a shear web or and elongate section thereof or a tower, or an elongate section thereof or other elongate wind turbine component or elongate section thereof. Preferably, an "elongate object" in the context of this invention may have an irregular shape along its length, such as a non-uniform cross-section along its length. Preferably, the method may be applied to the weighing of an elongate object which may be a large elongate object, such as a wind turbine blade or other wind turbine component. Preferably, the method may be applied to weighing wind turbine blades of any length, particularly with a length greater than about 10 m, still preferably above 12 m, still further preferably above 15 m or above 20 m or above 30 m. The terms "tip" and "root" are used in the context of an elongate object to define a first and a second and of that object. In the case of a wind turbine blade or blade spar or web, the terms "tip" and "root" may be understood more specifically although they nevertheless also denote respective first and second opposite ends of the blade or spar or web. The use of distance detectors may in particular allow different types of elongate object, e.g. different models or designs of wind turbine blade, to be weighed using a same set of weighing equipment at a same location.

In an optional aspect according to the invention, the method may further include the step of bringing the first and second distance sensors into mutual, horizontal alignment. This may ensure that both distance sensors are at an equal reference height. Alternatively, this may ensure that any difference between the actual vertical height of one distance sensor and the actual vertical height of the other sensor is known and may be compensated for when comparing the measured height values generated by the relevant sensors. Still further, this arrangement may allow precise measurements to be made on a ground surface which is not perfectly horizontal. In aspects optional of the invention, the step of bringing the first and second distance sensors into mutual, horizontal alignment may include adjusting the height of one or both distance sensors. This may be achieved, according to a further optional aspect, by adjusting the vertical height, extending above a ground surface, of a relevant distance sensor unit comprising a said distance sensor. In particular, in aspects of the invention, a distance sensor, in particular a contactless distance sensor and in particular a vertical distance sensor may be disposed in, on or at a height adjustable distance sensor unit. In particular, a distance sensor may be height-adjustably supported by a distance sensor unit.

In a further optional aspect, the method may include placing the respective first and second distance sensors at a predefined mutual separation distance from each other. In the present context a separation distance may preferably denote a horizontal separation distance. It may be appropriate to provide a specific predefined reference distance in respect of each or any type or design of elongate object to be weighed.

In a further optional aspect, the method may further include the step of placing the first and the second distance sensors such that they each make distance measurements in a vertical plane. This aspect is preferred and it allows readings to be taken between the respective distance sensors and locations on the underside of an elongate object, in particular at points on a lowermost surface along the elongate object. Advantageously, the method may be carried out using distance sensors each in the form of an optical emitter and detector arrangement such as a laser emitter/detector. A time-of flight type camera may be suitable. Alternatively, a laser emitter and sensor with a triangulation type function for calculating distance to an object may be used. Preferably, a two-dimensional optical scanner may be used. Preferably, the distance sensor may emit a two-dimensional array of optical radiation such as laser radiation. A receiver may detect rays reflected from surrounding objects.

In a still further aspect, the method may optionally include the step of aligning a first or a second distance sensor with a predefined reference location at a respective root or tip portion of the elongate object. This step may ensure that the distance sensors are always directed at, and therefore capable of measuring a distance to, specific reference locations on the elongate object to be measured. In this way, it may be ensured that a review of the respective distance measurements will give an indication of the orientation in space of the elongate object. Preferably, the elongate object may always be presented in relation to the relevant distance sensors such that it always presents a same, given surface towards them. Preferably therefore, the relevant reference locations on an elongate object are located at or on or near or about a presentation surface in relation to the distance sensors.

Optionally, the method may include the step of projecting a visible indication from a first and/or second distance sensor to the elongate object. The visible indication may in particular be a point or array of light projected in a measuring plane or along a line of measurement of the relevant distance sensor. In this way, an alignment between the distance sensors and known reference locations on the elongate object may be achieved. This may ensure that the distance between the elongate object and the relevant distance sensors is consistently measured between the same, reference locations on the elongate object.

In aspects, the method may include placing a reference mark at a predefined reference location on the elongate object, preferably at a root or a tip portion thereof. A reference mark may be in the form of a visible surface mark, such as a piece of applied tape or ink or such like. An alignment between a reference mark and a projected visible indication may confirm alignment between the distance sensors and the blade reference locations for distance measurement. In aspects, only a single reference mark may be applied to an elongate object under examination.

When one distance sensor is accurately positioned in respect of the relevant reference location on the elongate object, then provided the other distance sensor is correctly arranged at a predefined distance from the one distance sensor, then, by inference, that other sensor will be directed at the corresponding reference location on the elongate object. This applies in particular in respect of any given design or type of elongate object. A different design or type of elongate object to be examined may require another predefined separation distance between the distance sensors.

In aspects, a relevant reference mark may be three-dimensional. In particular, in aspects, a reference mark on an elongate object to be measured may be detectable by an optical distance detector. Preferably, for example, a three dimensional reference mark at a reference position on an elongate object may be discernible within a displayed representation of reflected radiation of a two-dimensional optical scanner. In particular, a three-dimensional reference mark may be in the form of a recess such as a hole or a dimple, or a projection such as a pin or a bump, at a predefined location on the elongate object. In preferred embodiments, a hole or a distinctly shaped bump may be placed at a root end of an elongate object. If the contour of the hole or projection is represented in the displayed distance representation data generated by the distance sensor, then this will confirm that the relevant distance sensor is making its distance measurements in respect of the relevant reference location on the elongate object. Again, by inference, the second distance sensor will then automatically be also making relevant distance measurements from a corresponding reference location on the elongate object if the two distance sensors have been positioned at a predefined horizontal distance apart from each other. This may apply irrespective of whether the second reference location comprises a marker. The method of the invention may encompass providing a marker at either or both a tip and root reference location on an elongate object.

In further optional aspects, the method may include adjusting the horizontality of the elongate object with reference to the distance measurement indications from the first and second distance sensors until that the elongate object adopts a predefined orientation. In particular, the horizontality of the elongate object may be adjusted incrementally while making successive distance measurements either after each incremental adjustment or concurrently while adjusting the orientation of the elongate object. This process may preferably be repeated until distance measurement indications from the first and second distance sensors show that a predefined orientation of the elongate object has been reached. This may in particular be manifested when distance measurement indications from both distance sensors correspond to predefined values or to a predefined difference in measured distances.

By way of explanation, a straight, uniform, elongate object such as a rod may desirably require to be in a perfectly horizontal orientation when weighed at a tip and a root end, for making a determination of its balanced weight. In such a case, respective first and second distance sensors, if horizontally aligned, would be required to indicate an equal height of the rod at both ends, in order to confirm its predefined orientation. In the case of an elongate object having an irregular shape, such as for example a wind turbine blade of a certain design and type, respective first and second distance sensors might indicate different respective measured heights of the elongate object between its tip and its root, which may nevertheless correspond to a predefined orientation for the wind turbine blade having that particular design. Another wind turbine blade having a second, different design may also be associated with different root and tip heights in its reference orientation for weighing, albeit different from the respective heights corresponding to the first blade design type.

According to still further aspects, the elongate object may be of a first type or design and having a first set of dimensions. The method may in particular be repeated to include weighing a second elongate object being of a second type or design, different from the first type and having a second set of dimensions different from the first set of dimensions. The first or second object may in particular be a large elongate object. The weight of a large object may exceed five or ten or twenty or thirty or forty tonnes.

In a further aspect of the method of the invention, the method may include the step of deriving, using the load values obtained from the root and tip load measurement gauges, a centre of gravity position of the elongate object. This may be achieved in particular according to known calculation procedures. By way of example, according to one aspect, the position of the centre of gravity, along a horizontal line drawn through the elongate object may in particular be derived. This may, by way of example, be achieved by knowing the horizontal separation between the tip load point and the root load point on the elongate object. The position of the centre of gravity at a horizontal distance between the tip load point and the root load point can be calculated using the mass moment characteristics revealed from the load measurements and from the relevant geometry. Other suitable methods of deriving the position of the centre of gravity may be employed using the load data gathered from the load sensors and observing the geometry of the elongate object and its manner of being suspended from load sensors.

Still further, the method may further include deriving, using the load values obtained from the root and tip load measurement gauges, a balanced weight value for the elongate object at a specific distance along the longitudinal extent of the elongate object. Methods for deriving the balanced weight of an object are known per se. In case of irregular shaped objects and in particular large such objects, the importance of starting from a consistent and repeatable reference position is both crucial to obtaining a correct outcome and correspondingly difficult to achieve. The method essentially involves making reliable weight determinations at known locations along an object's length and using these values, with their known locations along the object, in relation to a defined centre of rotation, to calculate the effective weight of the object at another, specified location along the object's length, about the said defined centre of rotation. The aforementioned weight determinations at known locations along an object's length may for example be load measurements made at a tip load point and at a root load point. The balanced weight location may coincide with the location of a ballast point on or inside the elongate object.

According to preferred aspects of the invention, the method according to the invention may be applied to an elongate object being a wind turbine blade. Designs or types of blades may differ from each other at least in respect of length, geometry, weight, weight distribution or any combination of these. In aspects, the step of suspending the elongate object may include suspending a wind turbine blade with its leading edge lowermost. In this way, and if the wind turbine blade is suspended above the distance sensors, then the wind turbine blades to be examined will always present a leading edge surface towards the distance sensors.

In the case of wind turbine blades for a horizontal axis wind turbine, the blades are often mounted in twos or threes on a rotor hub. Given the scale and perpetual motion of the rotor about its main shaft during service of the wind turbine, the scope for undue wear if the blades are not well balanced is evident and can lead to unnecessary and significant avoidable, damage, cost, and loss of efficiency. For this reason, the method of the invention may be particularly beneficial in the context of accurately balancing matched sets of two or three or more blades for a particular hub. When the method reveals that, for example three blades of a same type deviate from each other in their balanced weights, then a simple adjustment to two of these, e.g. usually by adding mass at the relevant balanced weight location, can bring the set of blades into, or approaching, perfect balance.

The method of the invention may include adding or subtracting mass from the balanced weight location of an elongate object after a determination of an object's balanced weight. When applied to wind turbine blades, this step may encompass adding or subtracting matter to or from a ballast tank at the relevant balanced weight location. Preferably, the method may include adding ballast to one or more blades from among a set of blades whose balanced weight is lower than that of another blade in said set. The weight of ballast material to be added may preferably correspond to the weight deficit in relation to the balanced weight of another blade.

In a further aspect, the invention may encompass an alignment system as defined in appended claim 11. Further preferred features of an alignment system according to aspects of the invention are defined in subclaims 12-13 and further described herein and in appended drawings. The alignment system according to aspects of the invention may be adapted for use in a weighing method according to the invention. The alignment system in particular comprises a first and a second distance sensor unit, each said unit including a contactless distance sensor. Each said distance sensor preferably includes an electromagnetic emitter and a detector head. An emitter may in particular be in the form of an array emitter, specifically a two-dimensional array emitter. Both the contactless distance sensors are preferably adapted for directing an electromagnetic beam in a vertical direction. To this end, a levelling device and fixable azimuth adjustment may be incorporated in the distance sensor unit. The first distance sensor unit may additionally comprise a contactless horizontal distance measuring gauge. The horizontal distance measuring gauge may in particular be configured for indicating a straight line distance to the second distance sensor. In particular, the first and/or second distance sensor unit may be height adjustable, thereby preferably permitting the height of a distance sensor to be adjustable at and in relation to a given distance sensor unit. Preferably, a distance sensor may be supported at a distance sensor unit. The alignment system according to this aspect of the invention may preferably permit alignment of different types of elongate object at a same examination location.

In a further, optional aspect, the alignment system may further comprise a control module associated with an input module and an output indicator module, and further associated with the first and second contactless distance sensors. In this context the term "associated with" implies a communication or control association between the respective elements. The control module may in particular be configured to receive an indication, via the input module, of a particular type or designation of elongate object to be weighed. The control module may be configured to derive and to indicate, preferably via an output indicator module and on the basis of measurements from the first and second contactless distance sensor, a status of the horizontality of the elongate object in relation to a predefined horizontality. In particular, the control module may be configured to derive and to indicate, a status of the horizontality of the elongate object in relation to a predefined horizontality in respect of a given, i.e. input, type or designation of the elongate object. In this way, following an input, by an operator or scanner or other input device or method, into the control module, of a designation of a relevant type of elongate object under examination, or to be examined, the control module may indicate, via an indicator such as a display or printer or audio signal or equivalent, whether or not the elongate object is in its predefined reference alignment. The control module may in particular indicate the directionality and/or extent of any deviation of the elongate object from its reference orientation.

In a further feature, the alignment system may comprise a horizontal distance gauge, capable of measuring a straight line separation between a first and second distance sensor. The horizontal distance gauge may preferably be a contactless distance gauge. The control module may preferably be operatively associated with the horizontal distance gauge 28. In a further aspect, the control module may be configured to receive an indication, preferably via an input module, of a type or designation of elongate object to be weighed. The control module may be configured to derive and to indicate, preferably via an output indicator module and on the basis of measurements from the horizontal distance gauge, a status of the separation distance between the first and the second distance sensors. In particular, the control module may be configured to derive and to indicate, a status of the separation distance between the first and the second distance sensors in relation to a predefined separation in respect of the relevant type (e.g., an input type or designation) of the elongate object.

In a further optional aspect, the control module of the alignment system may be configured to receive measurement signals originating from a root and a tip load sensor. The control module may be configured to derive and to indicate a balanced weight value for a relevant type or designation of the elongate object from the load sensor measurement signals. In particular the control module may be programmed with relevant algorithms for deriving a balanced weight indication in respect of different elongate object types and taking respective measured load values as a basis for making the relevant balanced weight derivation. Still further in particular, the control module may be programmed with relevant algorithms for deriving a centre of gravity location indication in respect of different elongate object types and taking respective measured load values as a basis for making the relevant centre of gravity location calculation.

In a further aspect, the alignment system may include a weighing system comprising a root and a tip load sensor. In this connection, the alignment system may further comprise a control module associated with each root and tip load sensor. The control module may be further associated with an input module and preferably also an output indicator module. The control module may be configured to receive an indication, preferably via the input module, of a type of said elongate object to be weighed. The control module may being configured to indicate, preferably via an output indicator module and on the basis of measurements from the root and tip load sensor, a value representing the balanced weight of the elongate object and in particular in respect of a relevant (e.g. input) type or designation of the elongate object under examination.

In a further aspect, the invention may encompass a weighing system further described herein and in appended drawings. The weighing system is in particular adapted for use in a method as set forth herein. The weighing system comprises a root and a tip load sensor in communication with a control unit. The weighing system furthermore comprises a first and a second distance sensor, also operatively associated with the control unit. The weighing system preferably further includes an indicator module and an input module and is configured for carrying out successive weighing of one or more different type or design or designation of said elongate object. Preferably, the weighing system further comprises a horizontal distance gauge capable of measuring and indicating a horizontal separation distance between the two distance sensors. Preferably, the control unit is operatively associated with the horizontal distance gauge. Preferably, the distance sensors are of a type described herein. Preferably, the distance sensors are height-adjustably mounted at respective distance sensor units of the weighing system. Preferably, the distance sensor units include azimuth adjustment and fixing elements for adjusting and fixing the vertical alignment of respective distance sensors.

In another aspect, the weighing system may preferably be configured to calculate, on the basis of a sensed root load and a sensed tip load, a balanced weight of an elongate object under examination. In another aspect, the weighing system may preferably be configured to calculate, on the basis of a sensed root load and a sensed tip load, a centre of gravity location of an elongate object under examination.

Preferably, the weighing system may be configured to indicate, for a given type of elongate object, and on the basis of a sensed root height and a sensed tip height, when it is in a predefined orientation for weighing.

Additional aspects of the invention including various optional features thereof will be explained with reference to the following non-limiting examples including the following drawings in which:

In an additional embodiment as set out in appended claim 14, the invention may comprise a method for weighing an elongate object extending between a root end and a tip end thereof, said method including:

providing a respective tip load measurement gauge and root load measurement gauge; and providing a suspending arrangement configured for suspending said elongate object from said tip load measurement gauge and from said root load measurement gauge; and suspending said object in a horizontal orientation; and recording a tip load and a root load from respective said load measurement gauges, said method being additionally characterised by:

providing a weighing area; and fixing an inclinometer to said suspended object and load gauge arrangement; and suspending said elongate object from said tip load gauge and from said root load gauge; and adjusting the horizontality of said elongate object in response to signals from said inclinometer prior to said step of recording said tip load and said root load. Preferably, the inclinometer may be fixed to the suspended object and load gauge arrangement in a predetermined orientation thereof relative to said suspended object and load gauge arrangement. Preferably, the inclinometer may be adjustably secured to said root support frame. Preferably said object may be an elongate wind turbine component such as a tower segment a blade or a spar. According to this further embodiment, the respective distance sensors or distance sensor units may not be required. According to this embodiment, the method may—if required—be performed in the absence of a flat ground surface.

Optionally, according to this further embodiment and as set out in claim 15, the method may further include suspending a root end of the object by means of a root support frame, the root support frame being provided with a said inclinometer. Preferably, the inclinometer may be fixed to the root support frame in a predetermined orientation thereof relative to said root support frame. Preferably, the inclinometer may be adjustably secured to said root support frame. Preferably, the root support frame may be fixedly secured to a root end of said object. Optionally, the method according to this embodiment may further include adjusting said horizontality of said elongate object with reference to angular output readings from said inclinometer until said elongate object adopts a predefined orientation. Optionally, according to the method according to this embodiment, the elongate object may be of a first type having a first set of dimensions; wherein the method may be repeated to include weighing a second, elongate object being of a second type different from said first type and having a second set of dimensions different from said first set of dimensions. Optionally, the method according to this embodiment may further include deriving, using the load values obtained from said root and said tip load measurement gauges, a centre of gravity position of the elongate object.

Optionally, the method according to this embodiment may further include deriving, using the load values obtained from said root and said tip load measurement gauges, a balanced weight value for said elongate object at a specific distance along said longitudinal extent of said elongate object. Optionally, according to the method according to this embodiment, said elongate object may be a large elongate object such as a wind turbine blade or wind turbine component.

Optionally the invention may include an alignment system adapted for use in a weighing method according to this embodiment, the alignment system comprising an inclinometer attached to a lifting frame configured for attachment to and for lifting a wind turbine blade root portion or wind turbine tower root portion or wind turbine spar root portion. Preferably, the inclinometer is adjustably connected to said frame. Optionally, the inclinometer may be connected directly to the object. Optionally, the alignment system may further comprise a control module associated with an input module and an output indicator module and further associated with said inclinometer; said control module being configured to receive an indication, via said input module, of a type of said elongate object to be weighed; said control module being configured to derive and to indicate, via said output indicator module and on the basis of measurements from said inclinometer, a status of the horizontality of said elongate object in relation to a predefined horizontality. A horizontality in this context may be expressed in degrees to or from a horizontal plane. Optionally, in the alignment system according to this embodiment, the control module may further be configured to receive measurement signals from a root and a tip load gauge and may be configured to derive and indicate a balanced weight value for a relevant type of said elongate object using said load gauge measurement signals and/or being configured to derive and indicate a centre of gravity location for a relevant type of said elongate object using said load gauge measurement signals. The alignment system according to this embodiment may further include a weighing system comprising a root and a tip load gauge. According to this embodiment, the invention may further include a weighing system adapted for use in a method according to this embodiment, said system comprising a control unit in communication with said root and tip load gauges and with said inclinometer; said weighing system further including an indicator module and an input module and being adapted for carrying out weighing of one or more different type of said elongate object. Still further, the weighing system according to this embodiment may be configured to calculate, on the basis of a sensed root load and a sensed tip load, a location of a centre of gravity of said elongate object and/or a balanced weight of a said elongate object. Optionally, in a weighing system according to this embodiment, said system may be configured to indicate, for a given type of elongate object, when it is in a predefined orientation for weighing.

Figure 1:
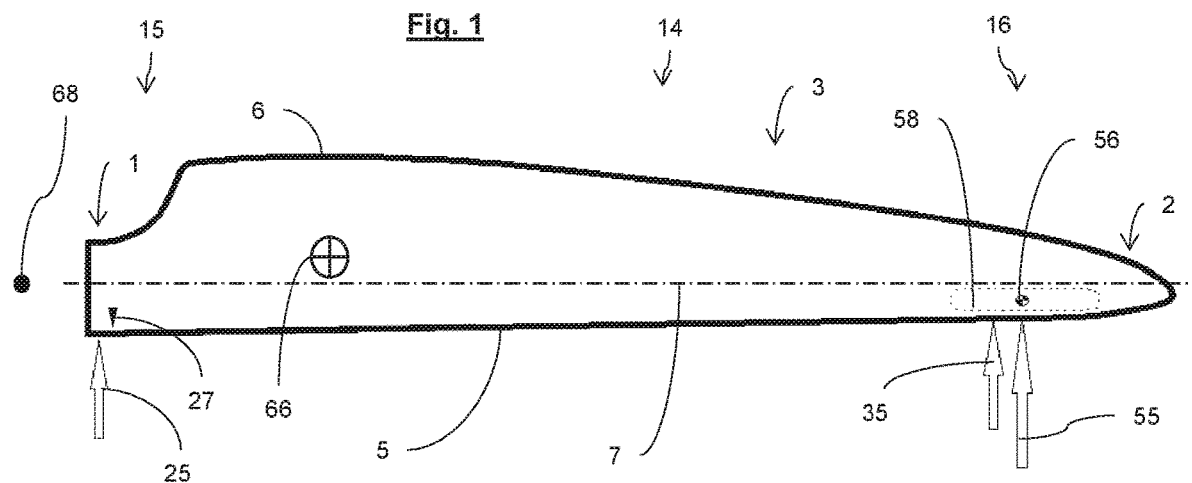
FIG. 1 shows a schematic and figurative view of an elongate object in the form of a wind turbine blade and certain features thereof.

An elongate object 14 is shown in FIG. 1, extending between a tip region 16 and a root region 15, and having a centre of gravity 66. Large elongate objects 14 of any description may generally need to be examined before their release from a manufacturing facility. This examination may include making a number of measurements and carrying out tests and may frequently include weighing. In some cases, it may be useful to determine the position of the centre of gravity 66 of an object 14. Still further, in the case of large objects 14 subject to or designed to undergo some kind of rotational motion, it may be desirable to calculate a balanced weight value about a defined—i.e. intended—centre of rotation of the elongate object 14. This may allow an improved prediction of the dynamics the elongate object 14 during rotational movement. It may also allow objects to be subsequently weight-adjusted during a finishing stage, in order to exhibit consistent characteristics. The balanced weight may preferably be calculated at a known reference location on an elongate object where, preferably, some adjustability of the object's mass may be made. In the method according to aspects of the present invention, it is of importance to reliably bring an elongate object 14 into a given orientation for weighing. For easy reference in the present example, a reference line 7 is indicated on the elongate object 14, in this case drawn between a tip region 16 and a root region 15 of the elongate object 14, in order to provide a recognisable reference indication for assessing or recognising the object's orientation, or for comparing the object's orientation with a desired orientation.

In the FIG. 1 illustration, and by way of example, the elongate object 14 is shown in the form of a wind turbine blade 3. This disclosure is therefore made both in general terms in relation to a generic elongate object 14 and in more specific terms to a wind turbine blade 3. The invention is not limited solely to aspects of these examples. The blade 3 extends in a spanwise, i.e. longitudinal, direction between a root 1 and a tip 2. It extends in a chordwise direction between a leading edge 5 and a trailing edge 6. The illustrated blade 3 is for a horizontal axis type wind turbine and is intended to be fixed to a rotor hub (not shown) along with one, two or three additional blades. Most usual is to fit three blades 3 to a rotor hub. In the case of wind turbine blades 3, these are destined to rotate as part of a rotor, as mentioned.

Each blade 3 in a rotor preferably needs to be balanced with the other rotor blades in order to ensure a smooth rotational operation during service at a wind turbine generator. The centre of rotation of a blade 3 typically lies on the central axis passing through a rotor hub. A centre of rotation 68 is marked in FIG. 1 by way of illustrative example although it may not be precisely representative or to scale. A centre of rotation 68 may lie externally or internally of an elongate object 14. One way of allowing adjustment of a blade's balanced weight, and thereby to achieve a balanced rotor, may be to provide a ballast tank 58 at a defined location along the length of a blade 3. The ballast tank 58 may serve to allow for addition of mass to a blade 3 at a predefined balanced weight locus 56 in the blade 3. In this context, the balanced weight locus 56 may be defined in spatial relation to the intended centre of rotation 68 of the blade 3 during operation. By way of example, the balanced weight locus 56 may not normally be coincident with the blade's centre of gravity 66. Alternatively, or exceptionally, ballast may be removed from the ballast tank 58 to adjust a blade's balanced weight by reducing the weight at the ballast tank location. In this way, sets of elongate objects 14 such as blades 3 of a given designation or type, which is to say: of a given design and construction, may be matched together in sets with the same balanced weight property. For example, a group of blades may be matched together in this way for connection as a set, to a rotor hub. In order to achieve this, the blades 3 may be individually weighed and from a determination of the blade weights, a "balanced" weight value at a reference locus 56 may be derived.

By way of example: if the weight of a blade 3 is measured at a root end 1 at a location 25 corresponding to a root load point and at a tip end 2, at a location 35 corresponding to a tip load point, and if the root load point 25 is separated a distance Lr from a centre of rotation 68, while the tip load point 35 is separated a distance Lt from the centre of rotation, and if the balanced weight location 56 is at distance b from the centre of rotation 68 (indicated in FIG. 1 using arrow 55), then the balanced weight Wb at the balanced weight location may be derived using:

$$Wb = \left(Wr * \frac{Lr}{b}\right) + \left(Wt * \frac{Lt}{b}\right)$$

where Wr is the weight measured at the root load point 25 and where Wt is the weight measured at the tip load point 35.

This method may be used on any relevant elongate object 14, and works well when a given type of object 14 to be examined is reliably brought into a predetermined orientation for weighing. If a same type of elongate object 14 is weighed at a defined location at a respective tip end 16 and root end 15, then a calculated balanced weight Wb may generate an incorrect or inconsistent set of values, if the object 14 being measured is not measured in a predefined, repeatable orientation.

In FIG. 1, the elongate object 14 such as a blade 3 has been shown with its reference line 7 in a predefined position in relation to its surroundings. In FIG. 1, the reference line 7 through the elongate object 14 is shown approximately horizontal. For the avoidance of doubt, the method of the invention does not require the object 14 under examination to be horizontally aligned or for a predefined axis of the object to be horizontal. However, a predefined orientation of the object 14 to be examined should be chosen such that it is geometrically recognisable and also repeatable from one object to the next. Thus, in the present context, a horizontal line or plane provides a useful reference for assessing whether or not an object having a known geometry is in a given orientation. A horizontal line or plane is not a required orientation for an object to be weighed. On the other hand, an approximate or very general horizontal orientation of an object's main axis may be preferred in optional aspects of the present method because it generally gives good results. In the present method, each particular type of object 14 which may be examined preferably is associated with a predefined, reference orientation corresponding to that object type, model, design or designation. Objects having a common designation may preferably be examined in a common predefined orientation. Objects 14 of a different type, model, design or designation may be examined in a different, but common predefined orientation, common, that is, to the particular object type in the relevant case.

By way of example, the illustration in FIG. 1 shows a wind turbine blade 3 of a given type, in a chosen, predefined orientation corresponding to the particular blade type in question. In this orientation, the orientation of the blade reference line 7 appears approximately horizontal.

Figure 2:
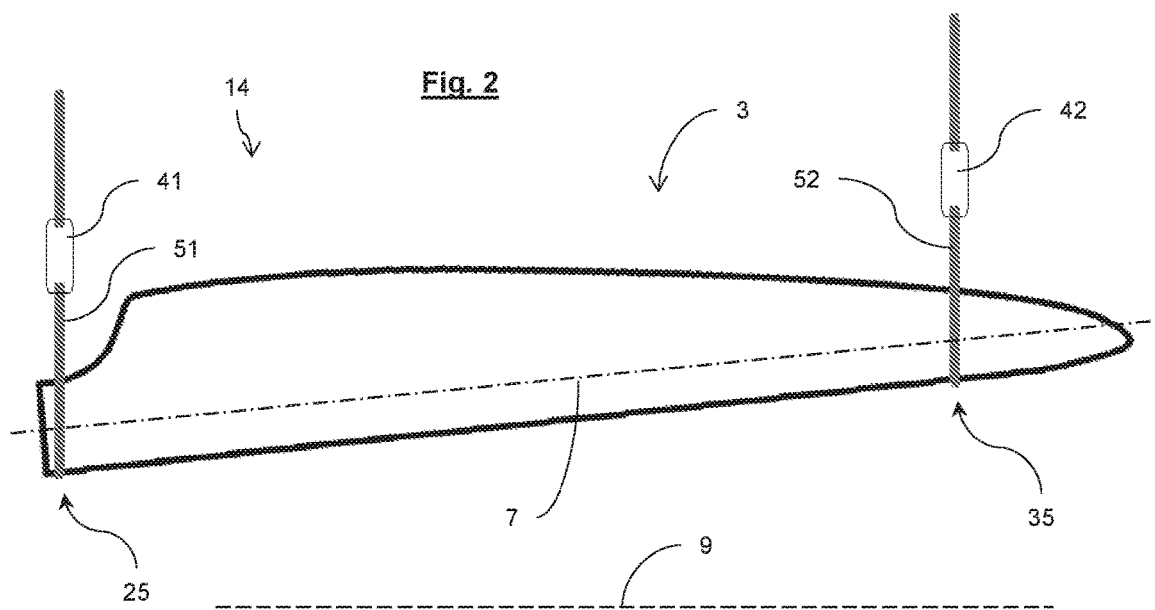
FIG. 2 shows schematic and figurative view of an elongate object suspended at a root and tip end and at a non-reference orientation.

In order to weigh an elongate object 14, it may be suspended from a tip load gauge 42 and a root load gauge 41, as illustrated in FIG. 2. A load gauge 41, 42 may comprise any suitable kind of load sensor. A load sensor may in particular comprise a mechanical load sensor or an electronic load sensor or an electromechanical load sensor. An example of an electromechanical or electronic load sensor may include a so-called load cell. The object 14 may in particular be suspended via a root support 51 and a tip support 52, each respectively suspended from a load gauge 41, 42, which load gauge may in turn be suspended from a lifting device 54 such as a crane (not shown). A root support 51 may include a sling or a frame or a combination of these. A tip support 52 may include a sling or a frame or a combination of these. By way of example, the elongate object 14 shown in FIG. 2 may be a wind turbine blade 3 of the same type or design as shown in FIG. 1. As shown in FIG. 2, the reference line 7 through the blade 3 is not in its reference orientation per the FIG. 1 illustration. Instead, it is at a different angle with respect to its surroundings, represented in FIG. 2 by a horizontal reference line 9. In the illustrated non-reference orientation of the object 14 shown in FIG. 2, a weight reading Wr, Wt, respectively from a root load point 25 and a tip load point 35 on the elongate object 14, would show a different reading than if the elongate object 14 were aligned with its reference line 7 in the reference orientation relevant to the elongate object 14 type in question (as per, e.g. FIG. 1). In accordance with aspects of the invention, it is proposed to bring the elongate object 14 into the appropriate alignment for weighing, without using a fixed, dedicated positioning arrangement for supporting the blade, in particular from below, at the proposed weighing location. This proposed arrangement will allow for different types of elongate object 14 to be weighed at a single location.

Figure 3:
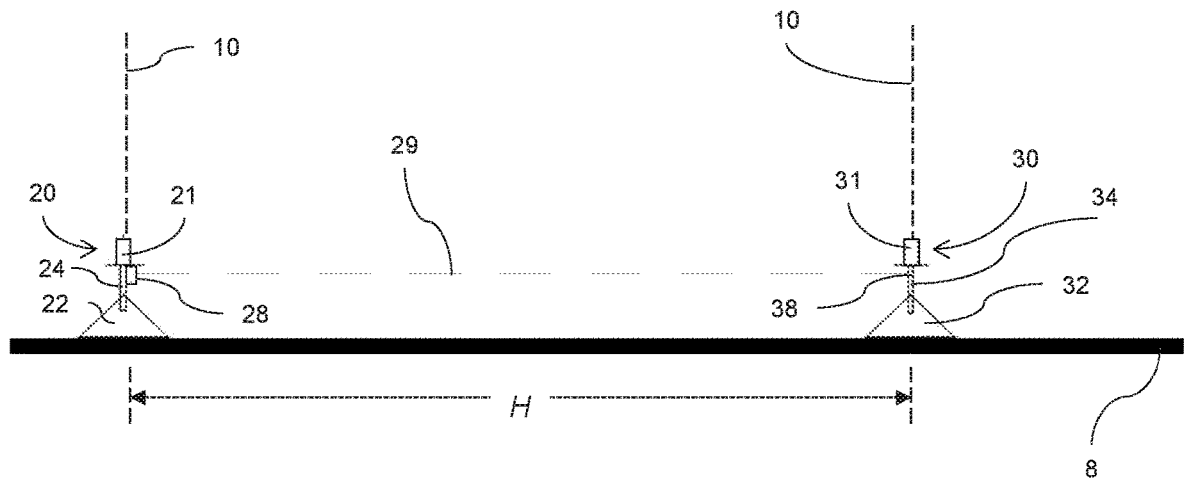
FIG. 3 shows a schematic and figurative view of two distance sensor units placed on a ground surface.

To this and other ends, there may be provided an inclination detection and indication apparatus 50 associated with an object 14 to be weighed. In one aspect, an inclination detection and indication apparatus 50 may comprise a root sensor unit 20 and a tip sensor unit 30. In particular, an inclination detection and indication apparatus 50 may comprise respective distance sensors in the form of a root sensor 21 and a tip sensor 31. Each sensor may preferably be contactless as between the sensor itself and the sensed object 14. Each root or tip sensor 21, 31 may return data indicative of a distance between itself and any relevant object within range of detection by the distance sensor. A distance sensor 21, 31 may preferably be mounted in or at a respective root or tip sensor unit 20, 30 and may preferably be supported by a relevant said sensor unit. FIG. 3 shows an exemplary root sensor unit 20 and a tip sensor unit 30. Both of these may preferably include a levelling device allowing the relevant distance sensor 21, 31 to be oriented in a given orientation. Most preferably, a levelling device at a root or tip sensor unit 20, 30 may allow a distance sensor 21, 31 to be oriented such that it makes a vertical detection of a distance between itself and a nearby object. A sensor unit 20, 30 including a levelling device may include such device as part of the distance sensor or as another part of the structure of a sensor unit 20, 30. A levelling device may for example comprise a spirit-level type indicator or other similar indicator, allowing an easy determination by a technician, of the alignment of a distance sensor 21, 31, in particular with respect to a horizontal plane. A sensor unit 20, 30 may be supported on a foot 22, 32 and may preferably comprise a stem 24, 34. Each sensor unit 20, 30 may preferably comprise a support element to which the relevant distance sensor 21, 31 is fixable. Preferably a support element of the sensor unit 20, 30 is adjustable to allow fixable adjustment of an azimuth orientation of the relevant distance sensor 20, 30. As shown in FIG. 3, a contactless distance sensor 20, 30 may project a detection beam in a vertical direction indicated by dotted line 10, which may represent a vertical line or which may designate a vertical line 10 within a plane.

Figure 9:
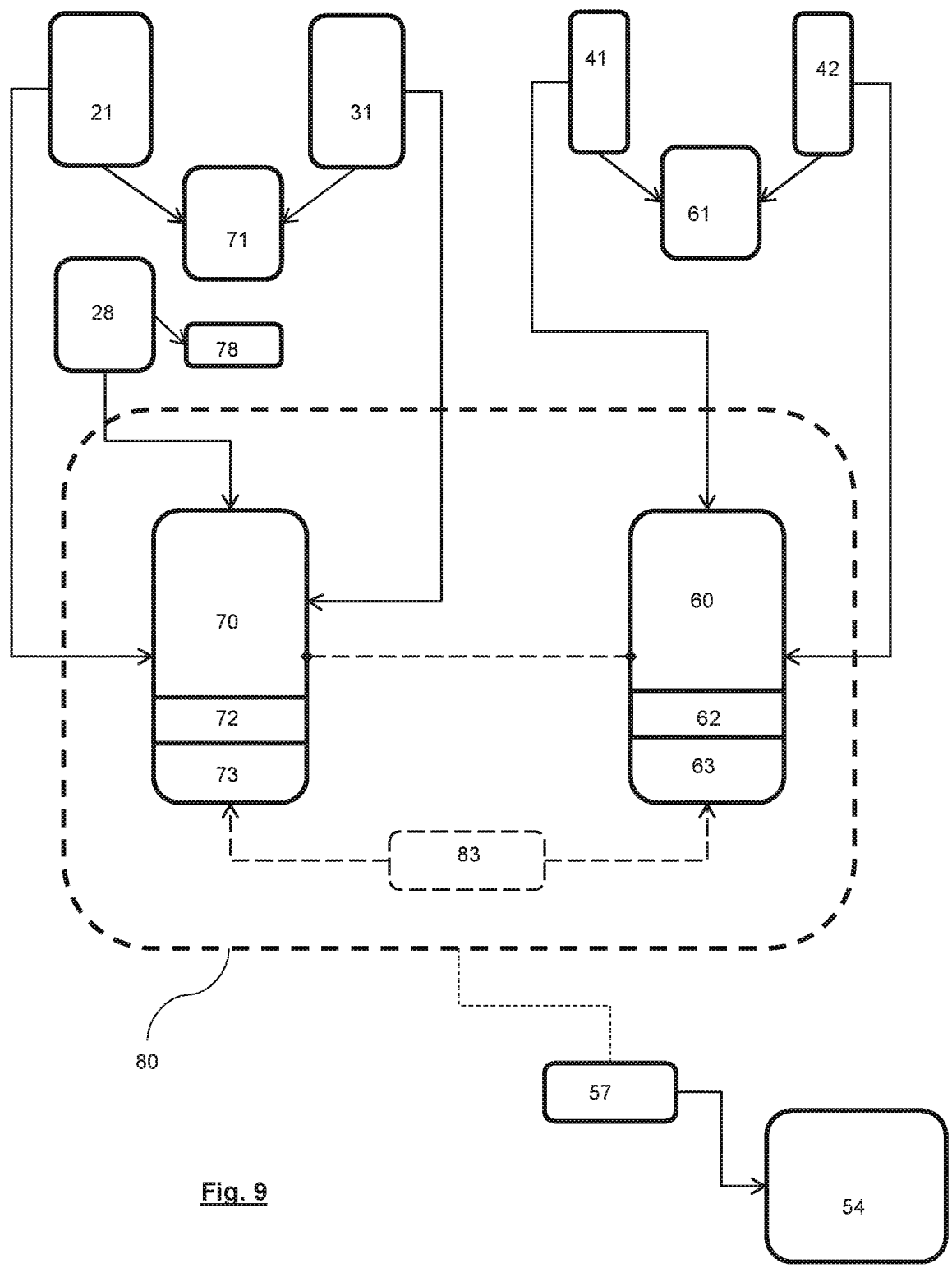
FIG. 9 shows a schematic and figurative view of elements of a weighing and alignment system.

The root distance sensor unit 20 and tip distance sensor unit 30 may be placed directly or indirectly on a ground surface 8. As illustrated in FIG. 3, this may be achieved by placing a root or tip sensor unit 20, 30 comprising a respective root and tip distance sensor 21, 31 on the ground 8. In order to bring the sensors 21, 31 into a predetermined position for measuring the orientation of an elongate object 14 such as a blade 3, in particular, an elongate object of a given model or type or design, the sensors 21, 31 may be placed a given distance apart on the ground surface 8. The relevant separation distance between the sensors 21, 31 may be defined in relation to an individual object 14 or, more preferably, to the type or design or designation of the object 14 to be weighed. To this end, one of the sensors 21, 31 or one of the sensor units 20, 30, may include a separation distance gauge 28, capable of measuring and indicating a distance to a nearby object and configured for sensing and indicating the separation distance between the two sensors 21, 31 or sensors units 20, 30. In particular, the separation distance gauge 28 may be configured to sense and to indicate a distance between itself and the other sensor 21, 31, or sensor unit 20, 30. This may be achieved using a gauge 28 comprising a beam 29 emitter and receiver type sensor capable of indicating a distance to a nearby object. A gauge of this type may comprise optical sensors or any suitable electromagnetic radiation sensors, in particular being contactless. In one aspect, a sensor 21, 31 or sensor unit 20, 30 may include a reflective surface, capable of reflecting an optical or electromagnetic beam 29 emitted by a separation distance gauge 28, in particular, such that the reflected beam may be detected by a receiver element of said separation distance gauger 28. In this way, the separation between the two sensor units 20, 30 or sensors 21, 31 may be detected. Preferably, the separation distance gauge 28 may comprise or may be associated with a horizontal distance indicator 78 (see FIG. 9). The distance indicator may be an electronic display and/or a printer output. In use, a separation distance gauge 28 may be configured to be directed such that it emits a beam 29 at an angle orthogonal to the direction of the detection beam 23, 33 of a relevant distance sensor 21, 31. An operator may thereby set up the relevant sensors 21, 31 such that they are separated a predetermined distance H apart. More particularly, an operator may thereby set up the relevant sensor units 20, 30 such that the sensors 21, 31 are separated a predetermined distance H apart. This may include moving one or both distance sensors 21, 31 towards or away from each other until a separation distance indicator 78 would indicate the correct, predefined separation applicable for the object 14 in question. Therefore in preferred aspects, the method of the invention may include the step of placing respective said first and second distance sensors 21, 31 at a predefined mutual separation distance H from each other.

Once positioned a given distance H apart, the distance sensors 21, 31 may be height-adjusted in order to ensure they adopt a horizontally aligned position prior to any distance measurements being made. To this end, one or both sensor units 20, 30 may be height-adjusted. In one aspect, a sensor unit 20, 30 may comprise height-adjustment elements allowing adjustment of the height of a respective distance sensor 21, 31 disposed or supported thereon. For example, a sensor unit 20, 30 may include a stem 24, 34 which may be a height-adjustment stem.

In aspects, a distance sensor 21, 31 or sensor unit 20, 30 may comprise reference markings which serve to allow verification of the relative vertical position of the distance sensors 21, 31 to each other. In particular, a reference indication at a distance sensor 21, 31 may serve to allow verification of a relative arrangement of the distance sensors corresponding to these being in a same plane, more particularly, at a same vertical height. In this condition, the distance sensors may be said to be horizontally aligned, i.e. defining a horizontal distance between them, and positioned along a single horizontal line or plane. Therefore in preferred aspects, the method of the invention may include the step of bringing first and second distance sensors 21, 31 into mutual, horizontal alignment.

Figure 4:
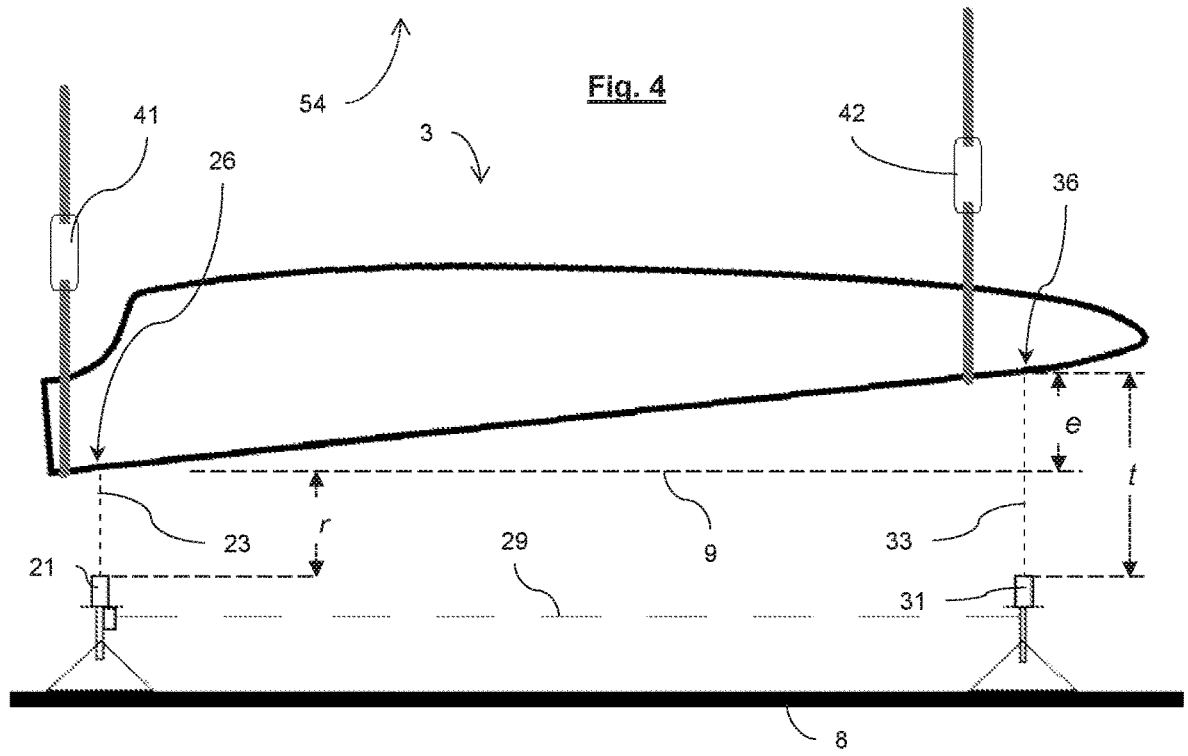
FIG. 4 shows a schematic and figurative view of an elongate object suspended in proximity to a pair of distance sensors.

With the distance sensors 21, 31 in position, supported by a ground surface 8, and separated a distance H apart, these may then be adjusted, possibly using an azimuthal adjustment, to direct a measurement beam 23, 33 in a vertical direction. When set up in this way, an elongate object 14 may be brought into the vicinity of the distance sensors 21, 31, as illustrated in FIG. 4. The elongate object 14 may preferably be suspended from a crane 54 for this purpose. Preferably, the elongate object 14 may be suspended from respective root and tip load gauges 41, 42, each supporting the elongate object at a respective root load measurement location 25 and tip load measurement location 35. The elongate object 14 may in particular be handled such that a root region 15 thereof is positioned nearby, and preferably above, a root distance sensor 21, while a tip region 16 thereof is positioned nearby, and preferably above, a tip distance sensor 31. A root distance measurement beam 23, emitted from an emitter of a root distance sensor 21 and directed up towards a reference location on the object 14, in this case being the root region 15 of the elongate object 14, will, when reflected and received at a receiver of said root distance sensor 21, be processed to thereby indicate a vertical distance between the distance sensor 21 and the root region 15 of the elongate object 14. An equivalent distance measurement may be made at the tip distance sensor 31, between itself and the tip region 16 of the elongate object, by means of a tip distance measurement beam 33. In this case, a reference location on the object 14 may be a tip region 16. It may be indicated in a similar way to the root distance measurement. For example root and/or tip height r, t, may be indicated, for example using suitable indicator equipment 71. In this way, a determination may be made as to the momentary orientation of the elongate object 14, whose geometry is known. In the illustrated example, a measured root distance r may be compared with a measured tip distance t, where r corresponds to the vertical distance between a root portion 15 of an elongate object 14 and a root distance sensor 21, while t corresponds to the vertical distance between a tip portion 16 of an elongate object 14 and a tip distance sensor 31.

In embodiments, a root and tip height measurement may be indicated using indicator equipment 71 as a difference e between r and t, where e may designate the difference between r and t and where e does not, or not necessarily, correspond to a difference value for a predefined orientation of an elongate object. In other words, a difference measurement indication e may be a displayed value of the measured difference between r and t during a preliminary phase of placing an elongate object 14 in its intended orientation. By way of example, a numerical indication may be given giving the height difference e between the root region 15 and the tip region 16. This numerical indication may be a positive number when e.g. t is greater than r, corresponding to a condition in which a tip region 16 lies higher than the root region 15. A negative number for e may, by way of example, designate a condition in which the root region 15 lies below the tip region 16. In other words, the height measurement indicator 71 may indicate a value corresponding to e=t−r. Of course, in embodiments and if preferred, the indicated value may correspond to e=r−t. Still further in embodiments, distance sensor indicator equipment 71 may indicate a simple direction indication, showing whether, for the relevant object 14 or model or design of object 14, the tip region 16 may be too high or too low in relation to the root region 15, or whether the respective tip or root region would lie at the appropriate heights for the relevant object 14, that is to say, those relative heights of the tip and root regions 16, 15 which correspond to the predefined orientation for the relevant object 14.

Hence, an operator seeking to bring an elongate object 14 into its relevant predefined orientation for weighing, may, according to aspects of the invention, move the object 14 above the relevant distance sensors 21, 31 as described above and use the indicated output information from these distance sensors 21, 31 to adjust the orientation of the object 14 until the indicated information confirms that the object 14 is in the appropriate orientation for carrying out a weighing step. In doing so, the horizontality of the object 14 may thereby be adjusted. This may be done in any suitable way, for example incrementally, taking repeated distance measurements, or progressively, using a continuous feedback of the updated orientation of the relevant object 14.

For any elongate object 14, or type of object 14, a predefined orientation of the object 14 for weight measurement purposes may correspond to a given difference d between the measured values of r and t. In this context, distance d is a predefined value, or target value of the measured difference e. The difference could also be intended to be zero, in cases where it would be intended to bring the elongate object, for weight measurement, into a predefined orientation in which the tip and root regions 16, 15 respectively would be placed at an equal height. In this disclosure, the terms r and t and e are applied during a measurement and adjustment phase of the method, while the corresponding values R and T and d are used when the relevant object 14 has been placed into its reference orientation.

Figure 5:
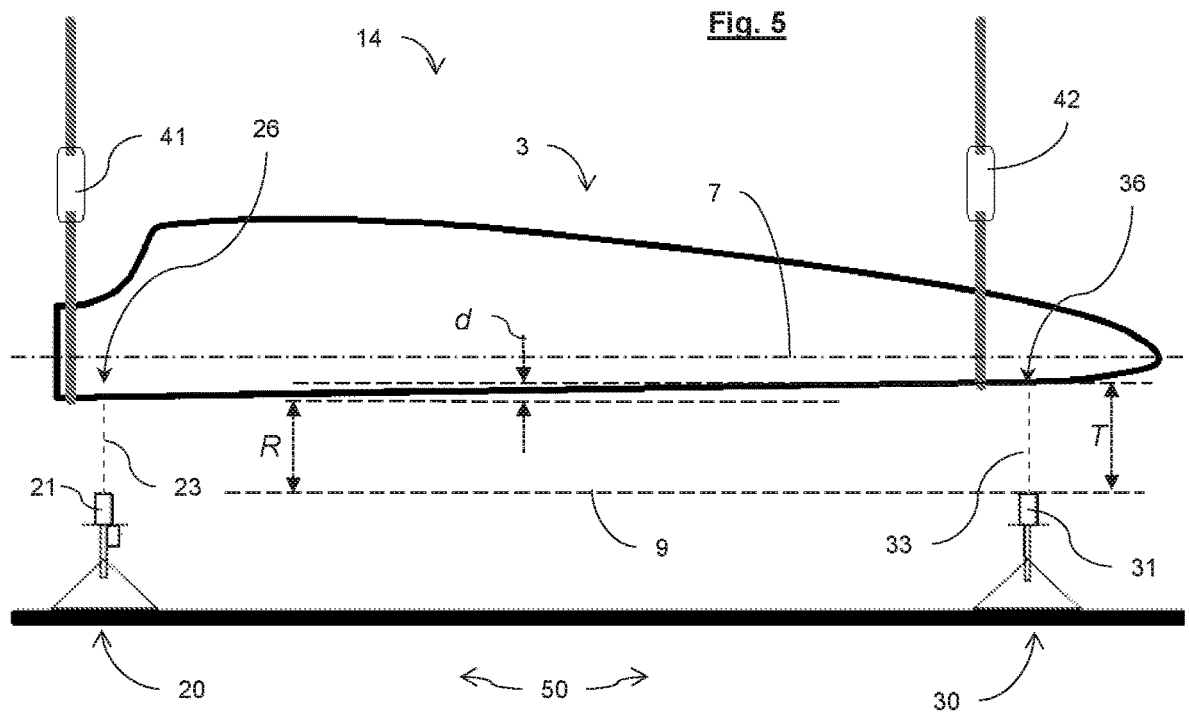
FIG. 5 shows a further schematic and figurative view of an elongate object suspended in proximity to a pair of distance sensors in an adjusted orientation.

An example of an object 14 having been brought into a desired, predefined orientation for weighing is illustrated in FIG. 5. Here, the difference d between the height of the object 14 at the tip reference location 36 and the height of the object 14 at the root reference location 26 corresponds to a predefined reference value and thereby signifies that the object 14 (a blade 3) is in its weighing orientation.

Subsequently, the weighing step may be carried out by reading or recording measured values from load gauges 41, 42, while maintaining the object 14 in its predefined orientation. A calculation of the positional distance along an object, of the object's centre of gravity may be made in a number of ways. One method involves recording the value for each weight measurement at a respective load gauge and the position along the object 14 of each load measurement reference point 25, 35, and using:

$$CoG = \left(\frac{(WrRr) + (WtRt)}{Wa}\right)$$

where CoG is the distance location of the centre of gravity away from a reference point, while Rr and Rt respectively are the distances of a root load measurement point 25 and a tip load measurement point 35 from the reference point. Wr and Wt are the respective measured weights of the object 14 at the respective root load measurement reference point 25 and tip load measurement reference point 35. Wa is the combined weight of the object (i.e. Wr Wt). Alternatively, or in addition, a balanced weight value for the object, such as a wind turbine blade 3 may be calculated using the earlier indicated equation.

Figure 6:
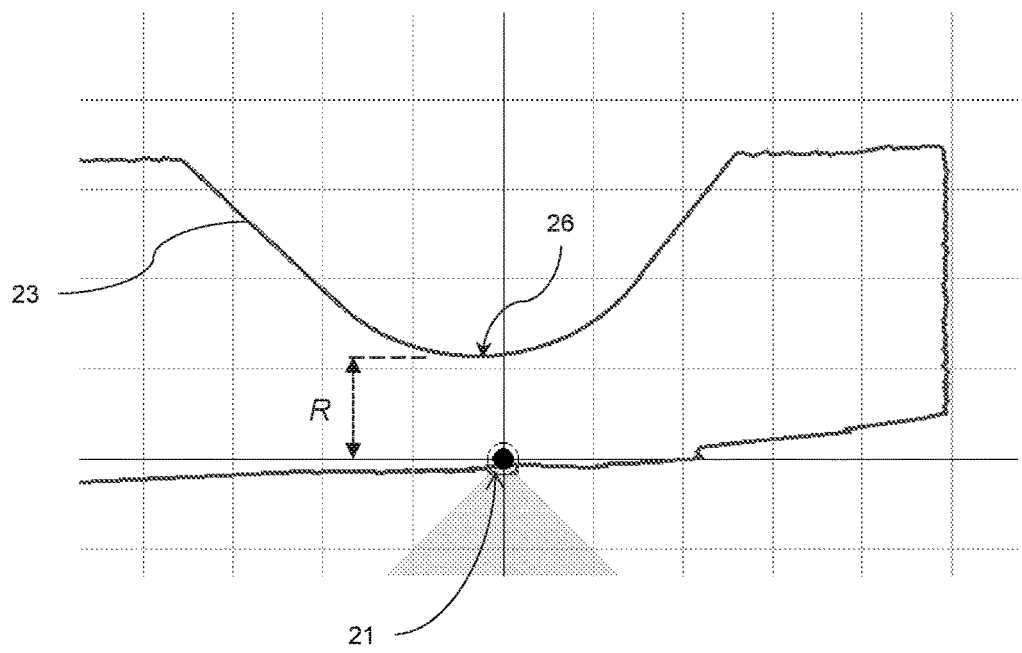
FIG. 6 shows a schematic and figurative view of an indicator display of measurement data from a distance sensor representing a portion of an elongate object.

By way of example, a distance sensor 21, 31 may comprise a laser scanner type distance sensor which may emit distance measurement radiation 23, 33, in the form of a planar array of laser light. The received reflected light at the sensor 21 may thereby be used to represent the proximity of objects in the field of the laser radiation array. This is represented by way of example in FIGS. 6 and 7. In particular, FIG. 6 shows the reflected radiation 23 from a root region 15 of a wind turbine blade 3 positioned nearby a distance sensor 21. The distance R corresponds to a vertical vicinity of the distance sensor 21 to a reference location 26 at a root portion of an object 14.

Figure 8:
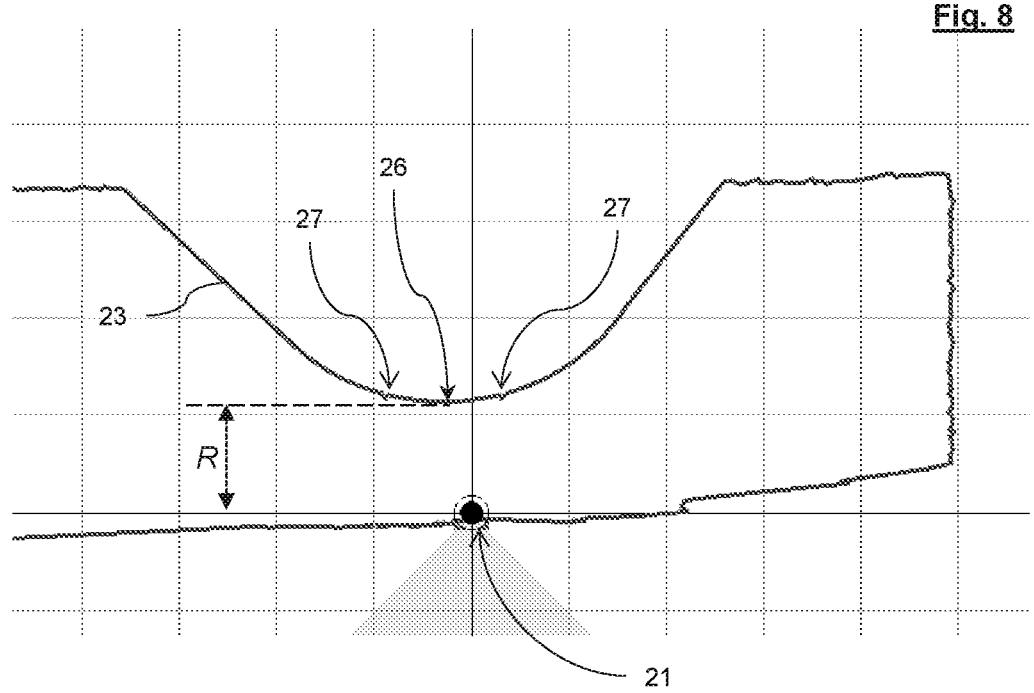
FIG. 8 shows a further view similar to that of FIG. 6, and wherein the elongate object includes a reference marking.

In embodiments, the accuracy of the method may be still further improved by ensuring that the distance measurement by the distance sensors 21, 31 is always made in relation to the same reference location on another object 14 of a corresponding type or design. This may be achieved, for example by emitting visible radiation from the distance sensor 21, 31 such that a spot or line or other light mark is visible on the relevant object 14. In this way, the object 14 may be moved into position near the relevant sensor 21, 31 such that the light spot or mark always falls at the desired reference location on the object, which may be e.g. a geometrically visible feature of the object. Alternatively, a reference marker 27 may be placed at a given, known, predefined location on the elongate object 14. Preferably, the marker 27 may interact with a distance sensor 21, 31, to enable the distance sensor always to make a height measurement reading in relation to the same place on an elongate object 14 of a given, known type and geometry. This may also be achieved by ensuring that a visible light spot or line emitted from the distance sensor 21, 31 always falls at the distance marker 27 on the object 14. Alternatively, as illustrated in FIG. 8, a marker 27 may be three dimensional and may be visible in a graphical representation of the distance measurement data received by a distance sensor 21. In the case illustrate in FIG. 8, the root portion 15 of an elongate object is provided with two small, three-dimensional points. These denote the reference location 26 at a root part 15 of the elongate object 14 to be placed in the relevant predefined orientation, from which a height determination is to be made. The reference location 26 or a marker 27 for making a determination, whether three-dimensional or two-dimensional, is located at a given distance away from the corresponding reference location 36 at the tip of the relevant object 14. In this way, once an object 14 is positioned with its root region 15 aligned with the root distance sensor 21, in particular, with the distance sensor aligned with a reference measurement location 26 at the root region 16, then the tip region 16 will automatically be in the relevant relation to the tip distance sensor 31. Naturally, the arrangement may be carried out the other way around, for example by placing a reference mark 27 at a reference location 36 of a tip region 16 and aligning a tip distance sensor 31 correspondingly, such that thereby also the root distance sensor 31 may be automatically aligned. Clearly, in the present method, the alignment of an elongate object 14 with respective distance sensors 21, 31 relies on the elongate object being placed with its tip region 16 nearby a tip distance sensor and with its root region 15 being nearby a root distance sensor 21. The term "nearby" in this context may denote a sufficient proximity for the relevant distance sensors 21, 31 to make a determination of the distance to the object 14.

Figure 7:
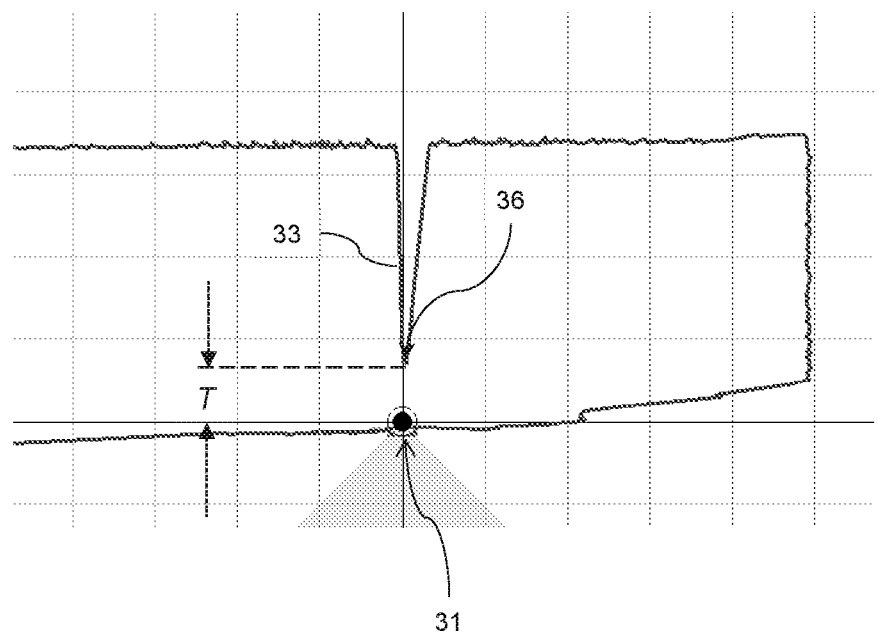
FIG. 7 shows a further schematic and figurative view of an indicator display of measurement data from a distance sensor representing a different portion of an elongate object.

In FIG. 7, the representation of the measurement data at a tip region 16 of an elongate object 14, which may be a wind turbine blade 3, is shown. The reference location 36 for a distance measurement reveals, according to the data, to be at a height T above the distance sensor 31. In both FIGS. 6 and 7, the outline of a respective root and tip region of the respective part of the elongate object—in this case a wind turbine blade 3—can be recognised, as the laser scanner type distance sensor 21, 31 returns a set of data representing the distance to a closest point from the sensor to its surroundings. In each case, to the right of the outline of a blade part in FIGS. 6 and 7, there appears to be a distance to a wall, while above the blade part, appear to be a distance to a ceiling.

An operator may use knowledge of the required relation between the represented values of R and T in order to adjust the orientation of an object 14 to the predefined reference orientation for weighing. Alternatively, an indicator device 71 may represent any value suitable to allow easy determination or recognition of the required action, if any, to be taken on the basis of the returned, measured distances R, T, by the distance sensors 21, 31. Optionally, a determination maybe made of the current difference d between the measured heights R and T. This may be displayed for example at indicator equipment 71 for easy understanding by an operator, perhaps apprised of a target value appropriate for the relevant object 14, of whether the relevant object 14 is at its predefined orientation, or whether further adjustment of its horizontality may be required.

FIG. 8 shows a variant, in which a three-dimensional marker 27 has been placed at a blade root region 15 at a relevant reference location 26 for making a blade height measurement. The shape of the marker 27 is visible in the graphical representation and confirms that the distance sensor 21 is projecting its distance measurement beam 23 on the relevant object 14 at a reference location 26 on the object where the markers 27 are placed.

With the object 14 in an appropriate orientation, weight measurements may be taken at the respective tip and root load sensors 41, 42. These values may be used, as described above, for determining a balanced weight of the object 14, such as wind turbine blades 3. Accordingly, after weighing a series of wind turbine blades 3 of a relevant type, these may be put into approximately matching groups. Groups may comprise sets of blades 3 with almost equal balanced weight values at the relevant balanced weight location 56. Within each group, one blade 3 may be designated as the reference blade against which other blades in the set will be adjusted, preferably by adding an appropriate quantity of ballast, in accordance with the relevant balanced weight determination.

In aspects, there may be provided ancillary equipment which may facilitate automation of aspects of the method described herein. In particular, there may be provided a load gauge control module 60 in a communication network with load gauge 41, 42. The load gauge control module 60 may be associated with an input 63 and an output 62. Input data may include data for programming of the load gauge control module 60, such as geometry data for individual objects 14 of for object types, design types or designations. This may for example enable the load gauge control module 60 to automatically calculate, using measured weight values from the load gauges 41, 42, a balanced weight for an object 14 being examined. Objects 14 with barcodes or other machine-readable or recognisable markings may be automatically recognised by the load gauge control module 60. Following a pair of load measurement inputs from the load gauges 41, 42, and using geometry data for the relevant object, coupled with the relevant algorithm for finding a balanced weight, the control module 60 may output the relevant balanced weight information in any appropriate format, for use. Additionally or alternatively, an indicator module 61 may allow ready recognition of load gauge measurement values, including in real-time if required.

In further aspects, there may be provided a distance sensor control module 70 in a communication network with distance sensors 21, 31. The distance sensor control module 70 may be associated with an input 73 and an output 72. Input data may include data for programming of the distance sensor control module 70, such as geometry data for individual objects 14 of for object types, design types or designations. This may for example enable the distance sensor control module 70 to automatically find a reference value d for the relative heights R and T, (as shown in FIG. 5) for an object 14 or object type being examined. Objects 14 with barcodes or other machine-readable or recognisable markings may be automatically recognised by the distance sensor control module 70. Following a pair of distance measurement inputs from the distance sensors 21, 31, the control module 70 may output the relevant information indicating e.g. a correct orientation or a need for further adjustment of a blade horizontality in any appropriate format for use. Additionally or alternatively, an indicator module 71 may allow ready recognition of distance sensor measurement values, including in real-time if required.

In an enhanced automation arrangement, respective control modules 60, 70 may be networked together. A single input of an object 14 or object type at an input 63, 73, may suffice for enabling automatic processing of both relevant height determination and balanced weight determination at a relevant indicator 62, 72.

Still further, in embodiments, there may be provided, in association with a distance sensor control module 70, a connection to a horizontal separation distance gauge 28. Again, after specific data for respective objects 14 or object types has been captured in the control module 70, a simple input to the module of information indicting the nature of the object 14 to be examined, may suffice for the controller 70 to display or otherwise indicate the required action to be taken with regard, for example, to adjusting a separation distance between the distance sensors 21, 31 in respect of a relevant object, or to indicate when the detected separation distance H is the correct one. Horizontal separation may be indicated at a horizontal distance indicator 78. Display 72 may alternatively indicate each or any of the distance data capable of being represented or indicated at indicators 71 or 78. A single input module 83 may replace or complement the two inputs 73, 63.

Still further, there may be provided a controller 57 for a crane or other positioning device 54 for manipulating and positioning and adjusting the position or orientation of an object 14 to be examined. Optionally, the controller 57 may be networked for automatic control and adjustment of positioning device 54, in response to measured height values at the sensors 21, 31.

Figure 10:
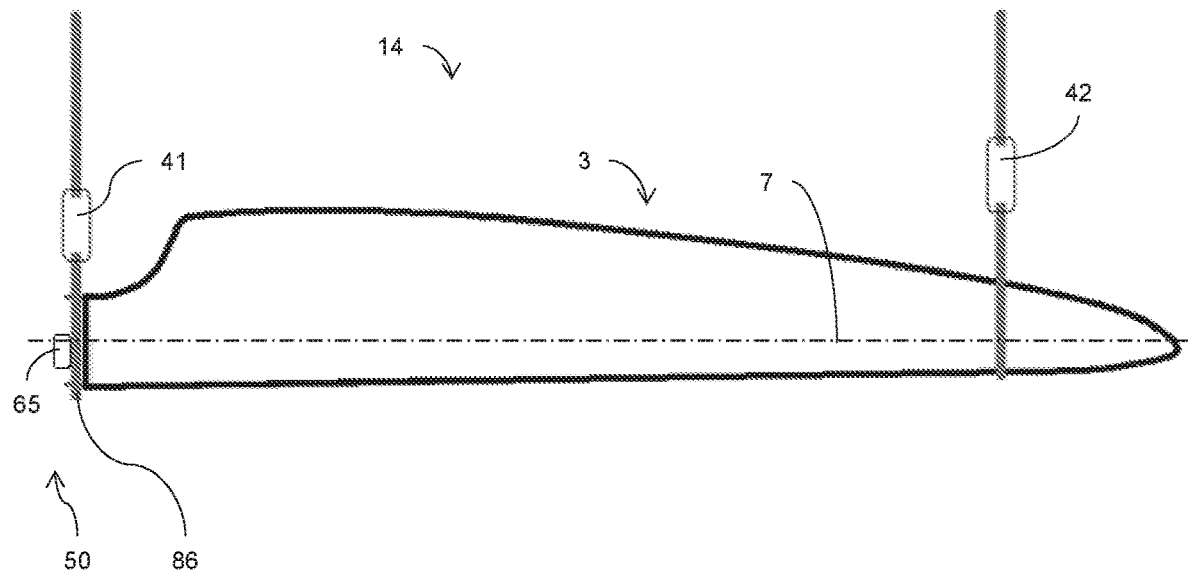
FIG. 10 shows a schematic view of a suspended elongate object according to another embodiment of the invention.
Figure 11:
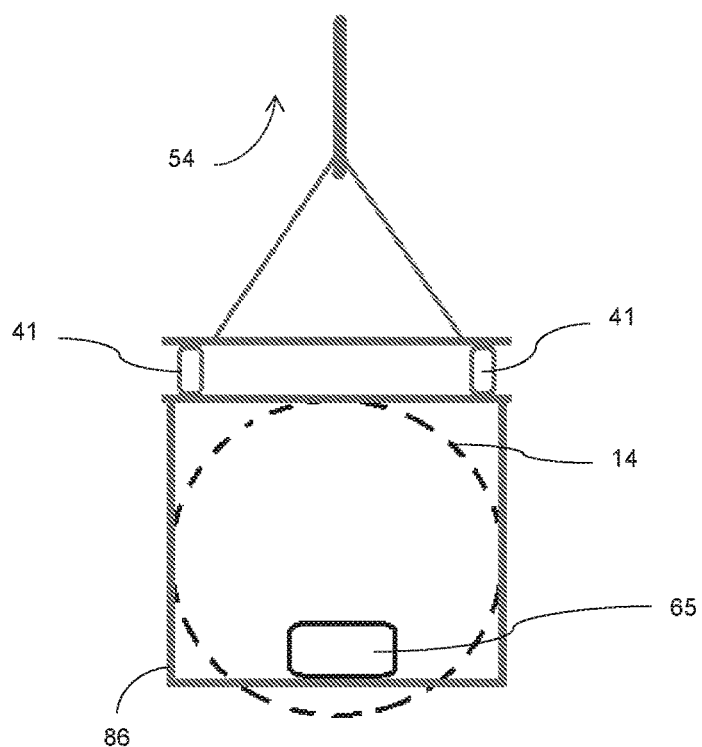
FIG. 11 shows an end view of an elongate object suspended via a support frame, according to another embodiment of the invention.
Figure 12:
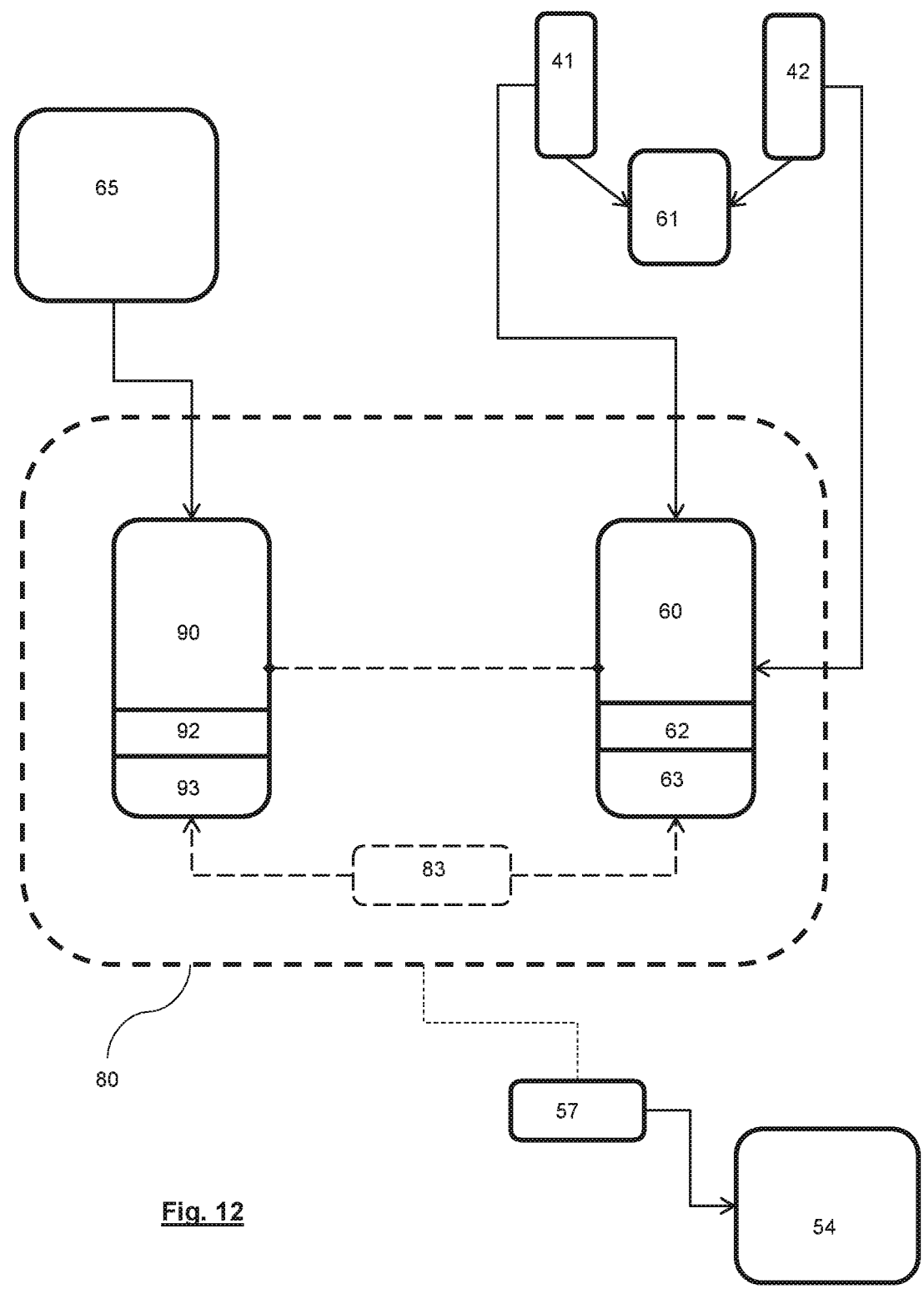
FIG. 12 shows a schematic and figurative view of elements of a weighing and alignment system according to a further embodiment of the invention.

In a further embodiment, aspects of which are illustrated in FIGS. 10-12, an inclination detection and indication apparatus 50 may comprise an inclinometer 65. The inclinometer 65 may preferably be associated with the suspended object 14, in particular, an inclinometer 65 may be associated with a suspended object 14 and load gauge 41, 42 arrangement. The inclinometer 65 will be rigidly coupled to the object 14 such that a change in the angular orientation of the longitudinal extent of the object 14 will also cause a corresponding change in the angular orientation of the inclinometer 65. An output of the inclinometer 65 may therefore be used to indicate an angular orientation of the longitudinal extent of the object 14. An inclinometer 65 may be attached to a suspended object 14 such as a blade 3 in order to correctly position the object 14 at a predetermined angular orientation for weighing. The inclinometer 65 may in particular be fixedly associated with a load gauge 41 or 42. Preferably, the inclinometer may be fixed to a frame or support to which a load gauge 41, 42 is also fixedly attached. Still preferably, an inclinometer 65 may be fixed to a lifting support frame 86. A lifting support frame 86 may support a root or tip end 15, 16 of an object 14 to be weighed. As illustrated in FIGS. 10 and 11, a lifting support frame 86 is shown connected to a root end of a wind turbine blade 3. An inclinometer 65 is shown fixed to the support frame 86. Preferably, the inclinometer may be adjustably fixed to the frame 86, in particular allowing an angular adjustment thereof relative to the frame 86. In operation according to this embodiment, the angular orientation of the suspended object 14 is measured using the inclinometer 65 and in particular using output values from the inclinometer. When the output from the inclinometer 65 indicates that it has adopted an orientation which matches a desired orientation of the object 14, then a weighing operation as described above may be carried out. The inclinometer 65 may be associated with a control module 90 (see FIG. 12), which may receive the output values from the inclinometer 65 denoting its current angular orientation. Output values from an inclinometer 65 may be displayed via an output device 92. An input device 93 of the control module 90 may allow an operator to input the type or designation of object 14 being examined and may be analogous to the input device 73 shown in FIG. 9. Remaining features shown in the embodiment illustrated at FIG. 12 are analogous to those shown in FIG. 9. Therefore, in this aspect, in which no floor sensors units (e.g. 20, 30) are required, the invention may additionally reside in an improved method and means for examining an elongate object which may not require a pre-established weighing area. In the embodiment shown in FIG. 12, the relevant object 14 may have associated with it a given angular orientation to be adopted instead of a set of distance values discussed in connection with the embodiments of FIGS. 3-9. Once a correct, predetermined angular orientation has been signalled by the inclinometer 65 and, as the case may be, by the controller 90, a weighing operation may be carried out as described above. Determinations of blade parameters such as balanced weight or centre of gravity may be determined in the same way. Further details according to this embodiment may be seen from FIG. 10, in which a wind turbine blade 3 is shown suspended in a near horizontal orientation, its momentary angular orientation being signalled by outputs from an inclinometer 65 attached to a lifting support frame 86. The lifting support frame 86 is shown rigidly attached to the root end 15 of the blade 3. Preferably, the lifting frame 86 is attachable to the object 14 to be weighed in a predetermined orientation between the frame 86 and the object 14. For example, in the case of a wind turbine blade 3, whose geometry is non-symmetrical, the support frame 86, when used, may preferably always be connected to a blade 3, for example at its root face, in a predetermined orientation between the frame 86 and the root face. FIG. 11 shows an end view of an object 14 to which a lifting frame 86 is rigidly attached. An inclinometer 65 is shown fixed to the lifting support frame 86. The support frame 86, carrying in inclinometer 65, may be fixed to the blade 3 root always in a predetermined, given orientation with respect to the blade root.

Successive blades 3 to be weighed will thereby always be attached to the frame 86 with a same angle between the frame and the blade 3. A load gauge 41 which may comprise more than one load cell, is shown connecting the support frame 86 to a lifting arrangement 54 from which the object 14 and load gauge 41 are suspended. In aspects, an inclinometer 65 may be attached directly to an object 14 to be lifted. Where the object 14 is a tower segment of a wind turbine or a wind turbine blade 3 or blade spar, the inclinometer 65 could, for example, be connected to a bolt-hole or bushing at the root face of the blade 3 or tower segment or spar. An inclinometer 65 may be connected to any suitable feature of an object 14 to be weighed. Preferably, an inclinometer 65 may be attached to an object 14 in a repeatable manner, so that the inclinometer 14 adopts a same orientation in relation to successive objects 14, in particular in relation to successive objects 14 of a same type or designation or design. When an inclinometer 65 is attached directly to an object 14, the use of a lifting support frame 86 may be optional and the object 14 may be lifted bby any suitable means such as a straps or slings. According to the embodiment illustrated in FIGS. 10-12, an additional process step of calibrating the inclinometer may be applied. This may be carried out by applying a spirit level, such as a digital spirit level, to the inclinometer 65 or to a same element, e.g. frame 86, or object 14, to which the inclinometer is fixed. The inclinometer 65 may then be adjusted to output the same indication as the spirit level. This may be done by adjusting the inclinometer output or by adjusting the inclinometer support angle in relation to the spirit level until the two show a same angle indication. Alternatively, an angle correction may be applied to the inclinometer output by, e.g. a control element 90 associated with the inclinometer. This may be done by entering into the control unit 90, perhaps via an input device 93, the angle indicated by a spirit level for a corresponding inclinometer angle, and thereby to generate a correction for all other angle outputs of the inclinometer 65. In aspects, when the inclinometer 65, associated with the controller 90, is brought into a correct orientation for weighing the particular object 14 being examined, this can be recognised by the controller 90. A corresponding output may be displayed via output unit 92, perhaps as a visual display to an operator. Alternatively or additionally, a confirmatory audio signal may be generated by the output unit 92. In this way, an operator may be able to immediately continue with registering weighing readings, as described hereinbefore. In other aspects, the inclinometer 65, once correctly adjusted to output angular position readings, may be configured to output a signal indicating when it, and thereby when the elements to which it is attached, is in a correct angular orientation for carrying out a weight measurement of the object 14. In aspects, output indications from the inclinometer 65 may be presented via an output module 92 of the controller 90. In further aspects, the control module 90 may hold relevant data files corresponding to different types or designations of elongate object 14 to be examined. For each object type or designation or design etc., there may be associated a predetermined angular orientation of the object 14 for carrying out a weighing operation. An operator may key in, via an input module 93, the type of object 14 under examination. Alternatively, this information may be automatically entered into the input module 93 e.g. via a barcode scan.

Yet still further, there may be provided a main control module 80 taking over substantially all the functions of the previously described controllers 70 and 60 or 90 and 60. The main controller 80 may be provided with its own data input 83 as well as receiving inputs from the relevant sensors 65, or 21 and 31, and gauges 41, 42, in the same way as respective control modules 90 or 70 or 60. In addition, a main controller 80 may be networked for controlling the positioning device 54. Automatic object 14 recognition elements such as barcode scanners (not shown) or other similar product detectors (not shown) may be included in connection with the main controller 80.

Using the method and equipment according to various aspects of the invention, different objects or different types of object, such as different designs of wind turbine blades may be positioned and weighed. The location where positioning and weighing according to the invention can be carried out may be a location without dedicated or fixed positioning means or weighing means, and may comprise little more than a ground space such as a floor space or even, in aspects, an area with no conventional floor such as above uneven ground. Moreover after weighing a first object 14 using aspects of the method and equipment described above, it may be possible to repeat the weighing procedure, using the same equipment and same method steps, in respect of a second or subsequent object of a different design or type. Thereby, the centre of gravity or the second object, or a balanced weight of a second object, may likewise be accurately determined. In aspects, a single set of equipment and a single method may therefore be used for weighing objects of different types. In particular, the height measurement operations or angular measurement operations which constitute the position or orientation determination of the object, may be carried out at the same location as the weighing operation. Preferably, the process may be automated by capturing within a control module, and storing in a control module memory of the weighing and position or angle sensing equipment, relevant geometric data corresponding to more than one, preferably to a range, of different types of objects.

The examples illustrated herein show a variety of optional features or embodiments not all of which need to be combined together in the context of the invention. On the other hand, all and any recited or claimed features or aspects or embodiments may be combined together unless prevented by the laws of physics or unless manifestly impossible for another reason.

The invention claimed is:

1. A method for weighing a wind turbine blade extending between a root end and a tip end thereof, said method including:
   providing a respective tip load measurement gauge and root load measurement gauge;
   providing a suspending arrangement configured for suspending said wind turbine blade from said tip load measurement gauge at a tip load point and from said root load measurement gauge at a root load point, said tip and root load points being at respective root and tip load measurement reference points which are at known locations in relation to the geometry of said wind turbine blade;
   suspending said wind turbine blade at respective said tip and root load points in a horizontal orientation; and
   recording a tip load at said tip load point and a root load at said root load point from respective said load measurement gauges,
   said method being additionally characterized by:
   providing a weighing area including a ground surface; and
   placing a first distance sensor at a first location on said ground surface;
   placing a second distance sensor at a second location on said ground surface;
   suspending said wind turbine blade from said tip load gauge and from said root load gauge such that a said root end thereof is suspended proximate said first distance sensor and a said tip end thereof is suspended proximate said second distance sensor;
   measuring a first distance between said first distance sensor and a said root portion of said wind turbine blade;
   measuring a second distance between said second distance sensor and a said tip portion of said wind turbine blade;
   adjusting the horizontality of said wind turbine blade in response to said first and second distance readings until the wind turbine blade adopts a predefined orientation and prior to said step of recording said tip load and said root load; and
   deriving, using the load values obtained from said root and said tip load measurement gauges, a center of gravity position of said wind turbine blade and/or a balanced weight value for said wind turbine blade at a specific distance along a longitudinal extent of said wind turbine blade.

2. The method according to claim 1, wherein the wind turbine blade is of a particular type, and the predefined angular orientation is associated with the wind turbine blade type.

3. The method according to claim 1, further including the step of bringing said first and second distance sensors into mutual, horizontal alignment, preferably further including the step of placing respective said first and second distance sensors at a predefined mutual separation distance from each other.

4. The method according to claim 1, further including the step of placing the said first and second distance sensors such that they each make distance measurements in a vertical plane.

5. The method according to claim 1, wherein said first and/or second distance sensor is a contactless sensor comprising a two-dimensional array optical scanner.

6. The method according to claim 1, further including the step of aligning a said first or a second distance sensor with a predefined reference location at a respective said root or said tip portion of said wind turbine blade, preferably further including the step of projecting a visible indication from a said first or second distance sensor to the wind turbine blade.

7. The method according to claim 1, further including placing a reference mark at a predefined reference location on said wind turbine blade, preferably at a said root or a said tip portion thereof, preferably wherein said reference mark is three-dimensional.

8. The method according to claim 1, wherein said wind turbine blade is of a first type having a first set of dimensions is weighed; and wherein said method is repeated to include weighing a second wind turbine blade being of a second type, different from said first type and having a second set of dimensions different from said first set of dimensions.

9. The method according to claim 8, wherein the first and second wind turbine blades are weighed using a same set of weighing equipment at a same location.

10. An alignment system adapted for use in a weighing method of a wind turbine blade according to claim 1, said alignment system comprising a first and a second distance sensor unit, each said unit including a contactless distance sensor; both said contactless distance sensors being adapted for directing an electromagnetic beam in a vertical direction; and wherein said first and/or second distance sensor unit is height adjustable said alignment system further comprising a control module associated with an input module and an output indicator module, and further associated with said first and second contactless distance sensors.

11. The alignment system according to claim 10, further comprising a horizontal distance gauge, capable of measuring a straight line separation between said first and said second distance sensors preferably wherein said horizontal distance measuring gauge is a contactless horizontal distance measuring gauge, preferably comprised in said first distance sensor unit.

12. The alignment system according to claim 11, said control module being configured to receive measurement signals from a root and a tip load gauge, and being configured to derive and indicate a balanced weight value for a relevant type of a wind turbine blade using said load gauge measurement signals and/or being configured to derive and indicate a center of gravity location for a relevant type of said wind turbine blade using said load gauge measurement signals.

13. The alignment system according to claim 10, said control module being configured to receive an indication, via the input module, of a particular type or designation of wind turbine blade to be weighed, the control module preferably being configured to derive and to indicate, preferably via said output indicator module and on the basis of measurements from the first and second contactless distance sensor, a status of the horizontality of the wind turbine blade in relation to a predefined horizontality.

14. The method according to claim 1 wherein said load measurement gauges are positioned above said wind turbine blade.

15. A method for weighing a wind turbine blade extending between a root end and a tip end thereof, said method including:
  providing a load gauge arrangement including a tip load measurement gauge and a root load measurement gauge;
  providing a suspending arrangement configured for suspending said wind turbine blade from said tip load measurement gauge at a tip load point and from said root load measurement gauge at a root load point, said tip and root load points being at respective root and tip load measurement reference points which are at known locations in relation to the geometry of said wind turbine blade;
  suspending said wind turbine blade at respective said tip and root load points in a horizontal orientation; and
  recording a tip load at said tip load point and a root load at said root load point from respective said load measurement gauges,
  said method being additionally characterized by:
  providing a weighing area;
  fixing an inclinometer to said wind turbine blade and load gauge arrangement such that a change in the angular orientation of the longitudinal extent of the blade will cause a corresponding change in the angular orientation of the inclinometer;
  suspending said wind turbine blade from said tip load gauge and from said root load gauge;
  adjusting the horizontality of said wind turbine blade in response to signals from said inclinometer until the wind turbine blade adopts a predefined angular orientation and prior to said step of recording said tip load and said root load; and
  deriving, using the load values obtained from said root and said tip load measurement gauges, a center of gravity position of said wind turbine blade and/or a balanced weight value for said wind turbine blade at a specific distance along a longitudinal extent of said wind turbine blade.

16. The method according to claim 15 further including suspending a root end of said wind turbine blade by means of a root support frame, said root support frame being provided with said inclinometer.

17. The method according to claim 15 wherein the step of fixing an inclinometer to said wind turbine blade further includes fixing said inclinometer directly to said wind turbine blade.

18. The method according to claim 15 wherein said load measurement gauges are positioned above said wind turbine blade.

* * * * *